UNITED STATES PATENT OFFICE.

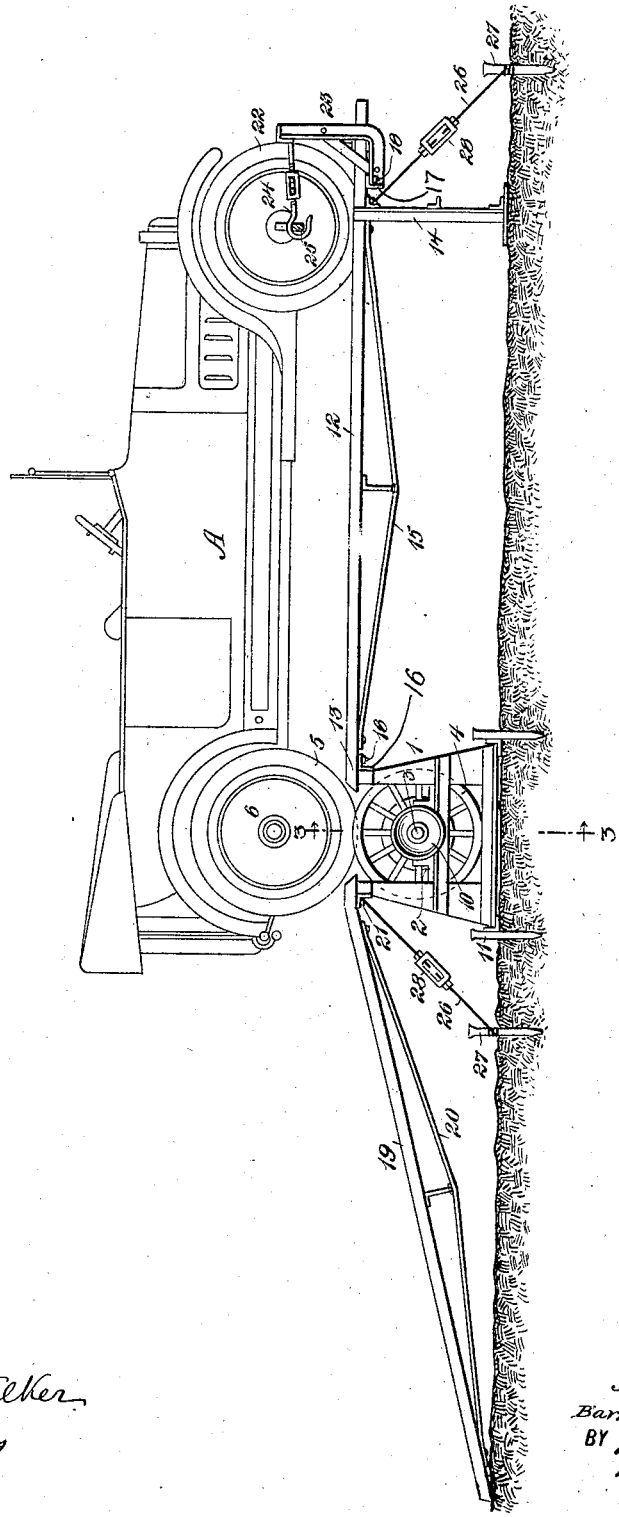

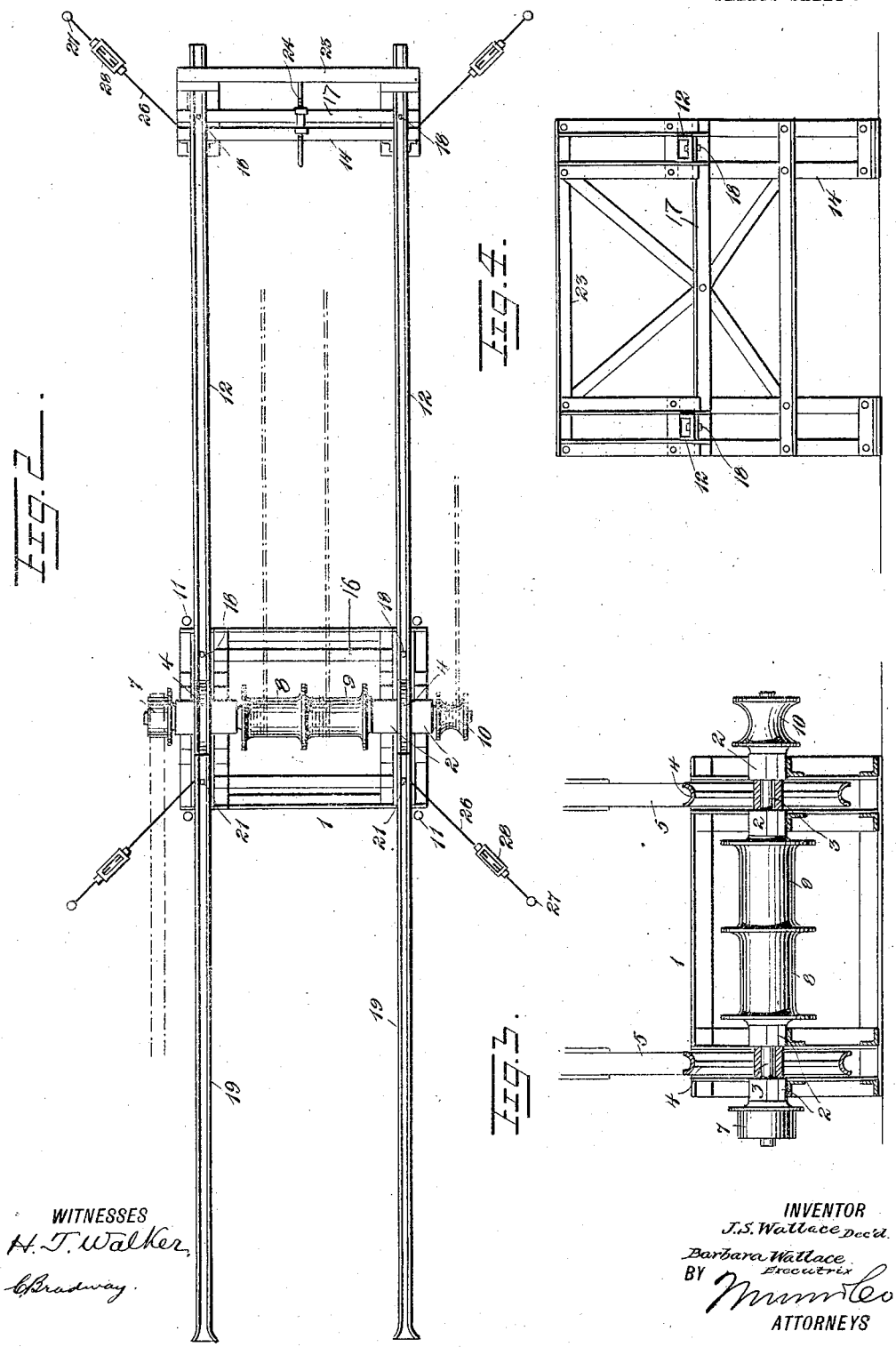

JOHN S. WALLACE, DECEASED, LATE OF BURLINGTON, NORTH DAKOTA, BY BARBARA WALLACE, EXECUTRIX, OF BURLINGTON, NORTH DAKOTA.

POWER-TRANSMITTING DEVICE.

1,252,062.    Specification of Letters Patent.    Patented Jan. 1, 1918.

Application filed May 26, 1917. Serial No. 171,123.

*To all whom it may concern:*

Be it known that JOHN S. WALLACE, now deceased, of whom the undersigned, BARBARA WALLACE, residing at Burlington, in the county of Ward and State of North Dakota, is the duly-appointed executrix, did invent certain new and useful Improvements in Power-Transmitting Devices, of which the following is a full, clear, and exact description.

This invention relates to power transmitting devices of that type disclosed in United States Letters Patent Serial No. 1,180,092, granted April 18, 1916, to the said John S. Wallace, in which an automobile can be employed as the prime mover for transmitting power for any desired purpose.

The general object of the present invention is to provide a power-transmitting device which is portable so that it can be readily taken apart and loaded into an automobile and transmitted to any point where it is required for service, the device being easily and quickly set up and the transporting automobile may be then used on the device for generating the power which is transmitted through the device for whatever purpose it is required.

A more specific object of the invention is the provision of a power transmitting device which is so designed that it can be set up at any place without the necessity of digging a pit, since the device embodies a plurality of supports on which are mounted elevated tracks to which the automobile is accessible through the incline or approach tracks, the tracks being detachable from the supports and each embodying a truss structure to obtain a maximum strength with a minimum of material.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the transmission device with an automobile shown in operative position thereon;

Fig. 2 is a plan view;

Fig. 3 is a vertical section on the line 3—3, Fig. 1; and

Fig. 4 is a front view of the device.

Referring to the drawing, 1 designates the transmission shaft frame which is of any desired construction and embodies a plurality of bearings 2 arranged in horizontal alinement for supporting the shaft 3, there being on the shaft spaced wheels 4 which have grooved fellies to conform to the tire 5 on the rear wheel 6 of the automobile A. On the shaft may be arranged a plurality of means for transmitting power from the shaft. Thus, in Figs. 2 and 3 the shaft is shown as provided with a belt pulley 7, cable drums 8 and 9, and a winch 10. The frame 1 is held in place in any suitable manner, as, for instance, by stakes 11 driven into the ground at opposite sides, it being understood that the frame is placed on top of the ground. This throws the top of the power-receiving wheels 4 some distance above the ground, so that the automobile A will be at an elevation. This necessitates elevated tracks 12 which have their rear ends 13 supported on the frame 1 and their front ends mounted on the support 14. Each track 12 is a channel iron reinforced by a truss rod 15. The ends of each channel iron are secured to angle irons 16 and 17 on the frame 1 and support 14 by bolts 18. This enables the tracks to be detached from their supports so that the tracks, as well as the supports, can be easily handled for transportation. To permit the automobile to reach the elevation shown in Fig. 1, an approach is formed by inclined tracks 19 which are reinforced by truss rods 20. The lower ends of these tracks rest on the ground while the upper ends rest on and are fastened by bolts 21 to the frame 1 at the side thereof opposite from the tracks 12. The tracks 12 and 19 are suitably spaced apart so that the rear wheels of the automobile can bear on the transmission wheels 4. The automobile drives up the approach under its own power, and it is stopped when the front wheels 22 reach the buffer frame 23, which frame is removably fastened, as by bolts, to the forward ends of the tracks 12. An adjustable hook or fastener 24 on the frame 23 is engaged with the front axle 25 so as to hold the automobile in such a position that the rear wheels will directly bear on the wheels 4. The whole structure when set up can be rendered rigid by means of guy wires 26 which are connected with the supports 1 and 14 and to stakes 27 driven into the ground. Each guy wire includes a turnbuckle 28.

From the foregoing description taken in connection with the accompanying drawing, the advantages of the construction and method of operation will be readily understood by those skilled in the art to which the invention appertains, and while the principle of operation has been described, together with the device which is now considered to be the best embodiment thereof, it is desired to have it understood that the device shown is merely illustrative and that such changes may be made when desired as fall within the scope of the appended claims.

Having thus described the invention, the following is claimed as new and desired to be secured by Letters Patent:

1. A device for transmitting power from a self-propelled vehicle, comprising a pair of spaced supports, elevated tracks resting on the supports, means for removably fastening the tracks to the supports, a buffer frame removably fastened to the tracks, inclined tracks having their upper ends resting on one of the supports in alinement with and spaced from the first-mentioned tracks, wheels mounted on one of the supports and disposed between the tracks, whereby the power wheels of the vehicle can rest on the said wheels, and means for delivering power from the said wheels.

2. A device for transmitting power from a self-propelled vehicle, comprising a pair of spaced supports, elevated tracks resting on the supports, means for removably fastening the tracks to the supports, a buffer frame removably fastened to the tracks, inclined tracks having their upper ends resting on one of the supports in alinement with and spaced from the first-mentioned tracks, wheels mounted on one of the supports and disposed between the tracks, whereby the power wheels of the vehicle can rest on the said wheels, means for delivering power from the said wheels, and guy means connected with the supports and having their outer ends anchored.

BARBARA WALLACE,
*Executrix of the estate of John S. Wallace, deceased.*